United States Patent [19]

Gambaro

[11] Patent Number: 5,332,322

[45] Date of Patent: *Jul. 26, 1994

[54] ERGONOMIC THUMB-ACTUABLE KEYBOARD FOR A HAND-GRIPPABLE DEVICE

[76] Inventor: Thomas L. Gambaro, 3231 SE. 36th Ave., Portland, Oreg. 97202

[*] Notice: The portion of the term of this patent subsequent to Jan. 12, 2010 has been disclaimed.

[21] Appl. No.: 3,118

[22] Filed: Jan. 11, 1993

Related U.S. Application Data

[63] Continuation-in-part of Ser. No. 711,760, Jun. 6, 1991, Pat. No. 5,178,477.

[51] Int. Cl.⁵ .................. B41J 5/14; H04M 7/00
[52] U.S. Cl. .................. 400/489; 379/433
[58] Field of Search .................. 400/489, 88; 364/709.15, 709.16, 705.05; 379/433, 368, 434, 440

[56] References Cited

U.S. PATENT DOCUMENTS

| | | | |
|---|---|---|---|
| D. 285,200 | 8/1986 | Bressler et al. | 379/434 |
| 2,369,807 | 2/1945 | Solon | 400/489 |
| 4,020,527 | 5/1977 | O'Neill | 400/88 |
| 4,244,659 | 1/1981 | Malt | 400/489 |
| 4,332,493 | 6/1982 | Einbinder | 400/486 |
| 4,579,470 | 4/1986 | Casey | 400/489 |
| 4,597,681 | 7/1986 | Hodges | 400/488 |
| 4,824,268 | 4/1989 | Diernisse | 400/486 |
| 4,849,732 | 7/1989 | Dolenc | 400/489 |
| 4,913,573 | 4/1990 | Retter | 400/489 |

FOREIGN PATENT DOCUMENTS 2725677  12/1977  Fed. Rep. of Germany ...... 400/489

OTHER PUBLICATIONS

Kennedy, "Hand-Held Data Input Device", IBM Technical Disclosure Bulletin, vol. 26, No. 11, Apr. 1984.

Harris Corp, "Model TS-22", Telephony, May 11, 1987, p. 97.

Telecommunication article from technical journal, publication and date unknown.

IBM Technical Disclosure, vol. 25, No. 9, Feb. 1983, A. Uchiyama, Kana Keyboard with Palm Rest, British Printer, Sep. 1977.

Primary Examiner—Edgar S. Burr
Assistant Examiner—Anthony H. Nguyen
Attorney, Agent, or Firm—Kolisch Hartwell Dickinson McCormack & Heuser

[57] ABSTRACT

A hand-held thumb-actuated ergonomic keyboard input device for use with a coupled electronic system such as a selector on a portable telephone. The device includes a housing which incorporates a hand-grippable portion that permits the device to be held in one hand with the thumb free to move at least temporarily to a predetermined key-actuation position. In other words, the grippable portion allows the device to be securely held with the fingers and with the thumb-free. A keyboard cluster is provided on the device in a concavity in the housing. The keyboard is located at the predetermined thumb-accessible key-actuation position and includes a key arrangement which allows the thumb to selectively actuate individual keys. Only slight gestural movements of the thumb are required to actuate individual keys on the keyboard. The gestural movements include mixed lateral and endo translation of the thumb within the keyboard concavity. The keyboard is particularly useful on devices such as portable telephones where two-hand actuation is sometimes difficult.

5 Claims, 6 Drawing Sheets

ERGONOMIC THUMB-ACTUABLE KEYBOARD FOR A HAND-GRIPPABLE DEVICE

CROSS REFERENCE TO RELATED APPLICATION

This is a continuation in part of application Ser. No. 07/711,760, filed Jun. 6, 1991, entitled "ERGONOMIC KEYBOARD INPUT DEVICE," which will issue as United States Letters Patent No. 5,178,477 on Jan. 12, 1993.

BACKGROUND AND SUMMARY OF THE INVENTION

The present invention relates to a keyboard input device for transmitting information to a suitably coupled electronic system, such as a telephonic switching system or a digital computer. More particularly, it relates to such a device wherein the keyboard is specially ergonomically designed with reference to the architecture of the human hand in such fashion that, at least with respect to the thumb on the hand, only slight gestural motion is required for effective, multiple, differentiated key actuation.

Electronic devices continue to be developed which incorporate keyboards or keypads for information entry into an electronic system. Hand-held devices, particularly devices designed to be gripped and held in one hand, are made for a variety of tasks. A portable telephone, such as a cellular telephone, is an example of a hand-held device designed to be gripped and held in one hand and which includes a keyboard information entry system. Because portable telephones are sometimes used by a person engaged in an activity which requires more or less continuous use of the hand which is not holding the telephone, such as driving a car, the ability to both grip a portable telephone and operate its keyboard with a single hand would be useful. Since the user's fingers are customarily employed in gripping the telephone, it would be particularly helpful if a keyboard could be provided which is operable by the user's thumb.

Recent advancements in the development of finger-associable key clusters have helped achieve a better understanding of how keys can be arranged to confront, in an advantageous way, the skeletal architecture of the hand. In the parent application of which this application is a continuation-in-part, namely, applicant Ser. No. 07/771,760, filed Jun. 6, 1991, entitled ERGONOMIC KEYBOARD INPUT DEVICE, which will issue as U.S. Pat. No. 5,178,477, the specification of which is incorporated herein by reference, I have described my new ergonomic keyboard input device which incorporates finger-associable key clusters. The problem addressed by my invention has lead to the development of a new generation of ergonomic keyboard input devices, of which the present invention is one example.

In recent past years, there has been a dynamic and explosive growth in the use of keyboard devices. This growth, as many know, has been driven largely by the proliferation and ready availability of computer systems for substantially all arenas of society, ranging from business to individual settings. Accompanying this explosion, unhappily for those who spend many hours using such devices, are various annoying and debilitating muscular syndromes that result from repetitive, fatiguing hand, wrist and finger motions that are required in the use of the ubiquitous, conventional typewriter-like keyboards. These syndromes translate not only into pain and discomfort for the affected users, but also into significant loss of productivity—clearly two problems to which corrective attention should be given.

Attention to this problem, generally, is not new in the art, as is evidenced by many serious attempts to alleviate keyboard-use "injuries" through innovative keyboard layouts and architectural designs. Two very good illustrations of approaches taken in the prior art are illustrated in U.S. Pat. Nos. 4,332,493 to Einbinder, and 4,849,732 to Dolenc.

The Einbinder patent discloses a typewriter keyboard in which, not only are keys laid out in a fashion relating to what might be though of as the "footprint" of the human hand, but also the proposed keys are designed with topographically height- and angle-differentiated actuation pads that tend to minimize, somewhat, overall hand and finger motion during use. However, the Einbinder system still focuses significant attention on the importance of having so-called "home positions" for the finger and thumb tips, from which positions the fingers (and therefore the hands) must travel appreciably in order to perform the usual kinds of typing operations. Thus, the Einbinder approach steps toward, but closes only a portion of the gap in, solving the motion difficulties encountered with conventional keyboards. Put another way, Einbinder does not substantially eliminate these difficulties.

The Dolenc patent illustrates and describes a one-hand key shell which includes fan-like arrays of plural keys distributed in elongate rows and organized for specific actuation by the thumb and four fingers of a hand. Angular and topographical distinctions for individual keys, such as those shown in the Einbinder patent, are not present in the Dolenc system. Dolenc also, apparently, does not establish a "home position" for the tips of the fingers and thumb. Dolenc is concerned with minimizing hand motion, but not particularly finger motion. In fact, Dolenc speaks in terms of organizing keys in the arrays in such a fashion that they take into account the "motion and range of the respective fingers of the hand." Thus, Dolenc clearly contemplates finger-tip actuation of each key, and reinforces this concept by teaching that a full equivalent of the push-button keys which he illustrates could take the form of a series of flat-panel touch pads. Accordingly, while Dolenc seriously addresses the issue of minimizing hand motion, his system does not appreciably contribute to minimizing finger motion (and hence related wrist motion).

There are other patents of which I am aware that address, to different degrees, modified keyboard arrangements. These include U.S. Pat. Nos. 2,369,807 to Solon, 4,244,659 to Malt, 4,579,470 to Casey, 4,597,681 to Hodges, and 4,824,268 to Diernisse H.V. None of these latter-mentioned five patents appears to address, at least as pointedly as Einbinder and Dolenc, the issues of keyboard motion "injuries."

In addressing the problems associated with repetitive finger motion I have also developed an ergonomic keyboard configuration which addresses the problem of providing a thumb-actuable keyboard on a hand-grippable device such as a portable telephone. Since there is a need for thumb-actuable keyboards on electronic instruments such as telephones, it is an object of the present invention to provide such a keyboard input device which allows a user to input numbers or other information into the device using only the thumb, thereby allowing the rest of the digits on the user's hand to be employed in gripping the device.

Another object of the invention is to provide a thumb-actuable key cluster on a keyboard which minimizes the motion required of the thumb to input information via actuation of the keys.

Still another object of the invention is to provide a thumb-actuable key cluster which is readily usable, by temporary movement of the thumb, to a key-actuation position on the device without having to release the user's grip on the device.

Accordingly, a hand-held device is provided for entering information into an electronic system via a keyboard. The device comprises a housing having a grippable portion which permits the device to be held in one hand with the thumb free to move at least temporarily to a predetermined key-actuation position while the device is held. The unique architecture of the device includes a concavity formed in the housing at the aforementioned key-actuation position. A thumb-associable cluster of keys forms a keyboard within the concavity. The keys are selectably actuable via mixed lateral, and slight endo, translation of a thumb within the concavity, whereby information is entered into the electronic system.

In its preferred form, the concavity on the housing of the device contains a plurality of keys which are located within a cone of motion of the user's thumb whose apex resides adjacent the base of the thumb. Individual keys in the cluster of keys are oriented in planes which are angularly offset from one another to permit selective actuation by minimal movement of a thumb positioned in the concavity.

These and other objects attained, and advantages offered, by the present invention will become more fully apparent as the description that now follows is read in conjunction with the accompanying drawings.

DETAILED DESCRIPTION AND BEST MODE FOR CARRYING OUT THE INVENTION

Figure 1:
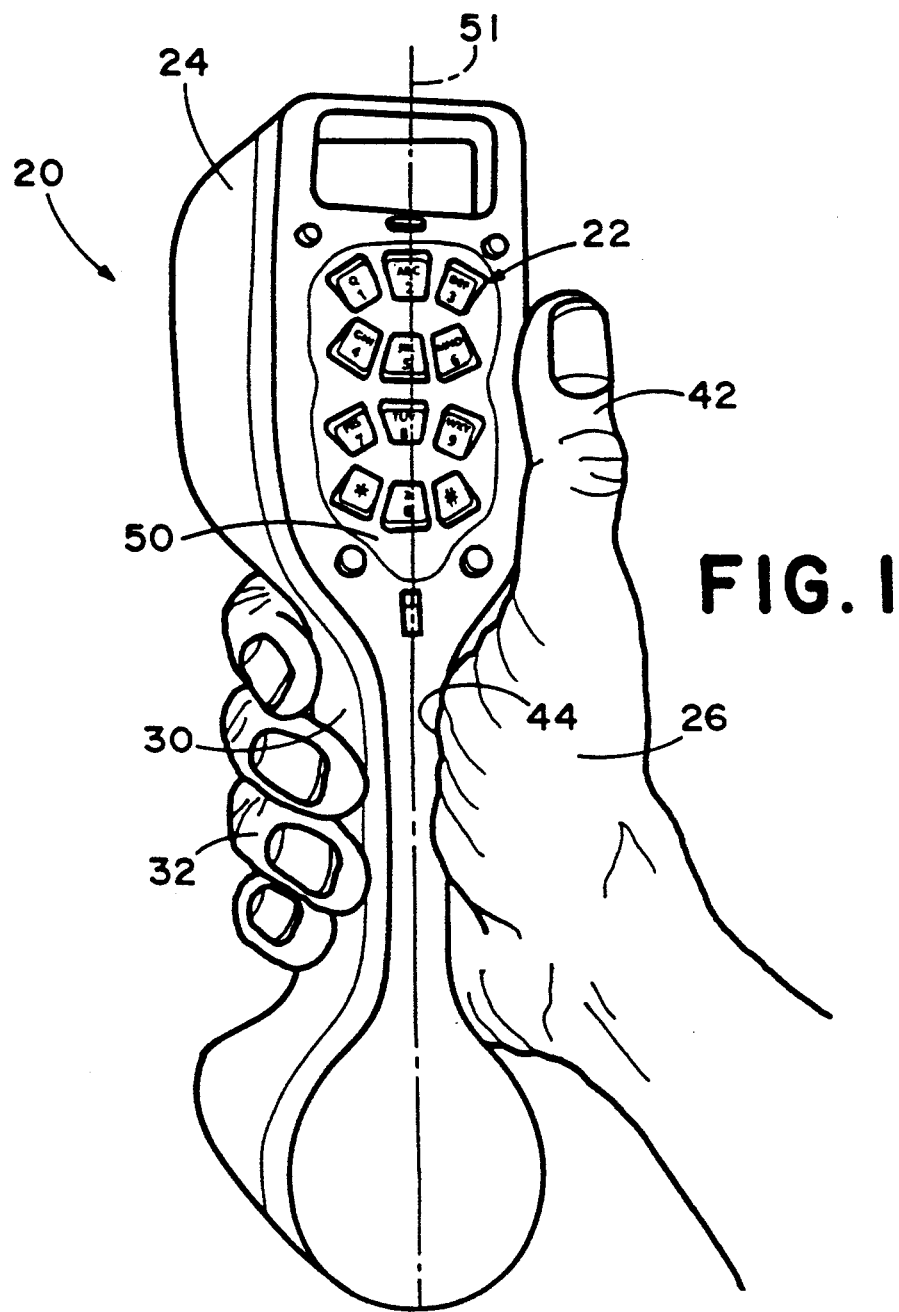
FIG. 1 is a perspective view of a hand-held portable telephone in accordance with the present invention with the thumb of the user's hand moved to a position adjacent the keyboard of the device.

Turning attention now to the drawings and referring first to FIG. 1, there is indicated generally at 20 a hand-held device, namely, a portable telephone, which incorporates my invention. The device 20 includes a keyboard 22 for transmitting information supplied by a human operator (user) to a suitable electronic system (not shown) such as the internal components within device 20, which are in turn coupled via a broadcast or wire connection to external devices (not shown). The coupling arrangement between keyboard 22 and a suitable electronic system is very well know to those skilled in the art and forms no part of the present invention. Hence, it is omitted from the drawings and from any further discussion.

The portable telephonic device 20 has an exterior housing 24 which is shaped or contoured to include at least a portion which is easily and securely held in the hand 26 of a user. In particular, the housing 24 includes a grippable portion 30 which is a part of the housing and is capable of being held in one hand with the user's fingers 32 partially wrapped around the grippable portion.

Figure 2:
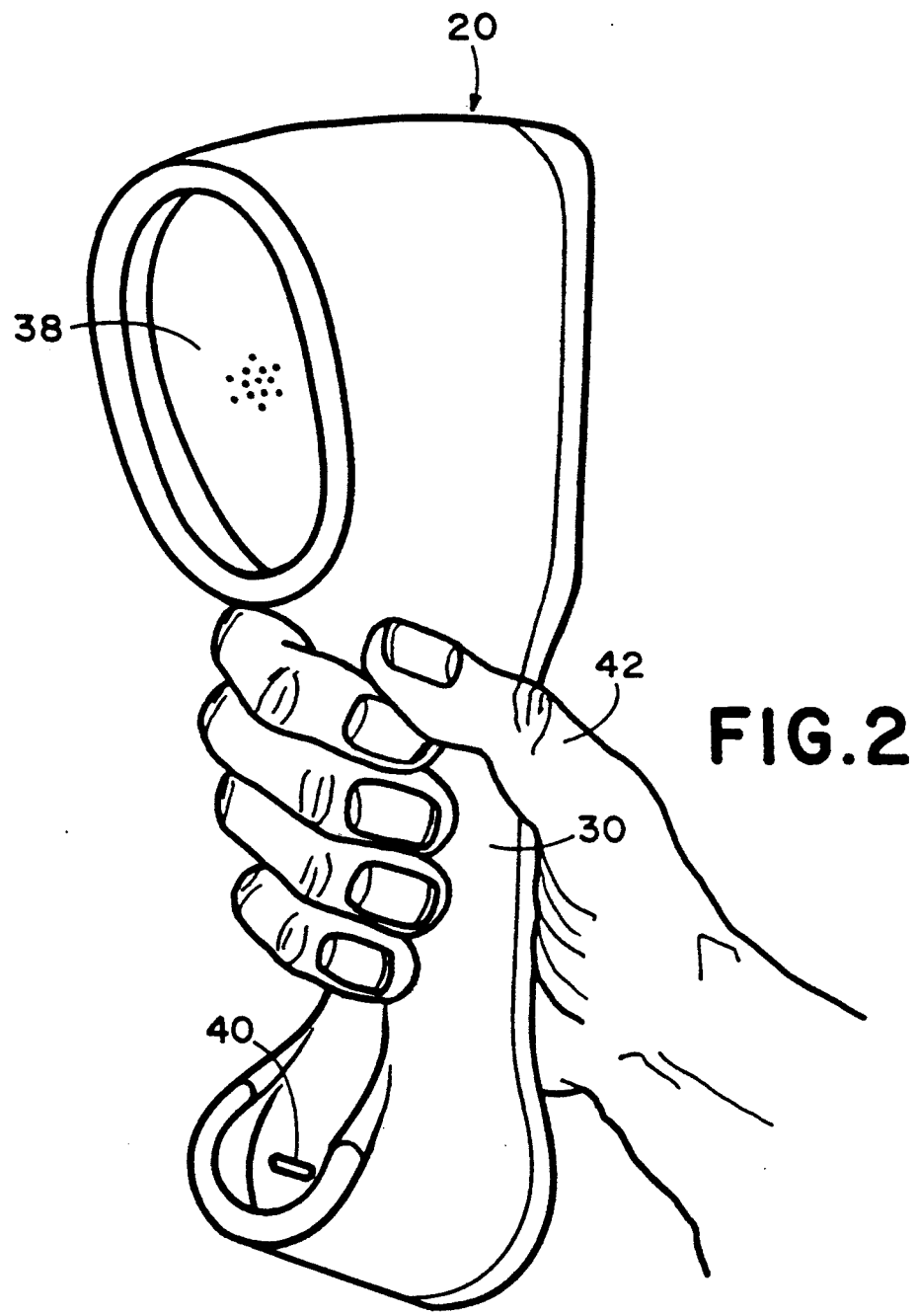
FIG. 2 is a perspective view of the portable telephone of FIG. 1, rotated in orientation, showing the device when it is gripped by the user with the thumb moved away from the keyboard of the device.

Keyboard 22 is provided on what may be thought of as the back side of the telephone, i.e., the side opposite to that which is held adjacent the user's mouth and ear when the telephone is used for conversational communication. FIG. 2 illustrates in perspective the front side of portable telephone 20 and shows the user's hand gripping the grippable portion 30 in a manner typically used when speaking into the telephone. The telephone includes an earpiece 38 for holding adjacent the user's ear and a mouthpiece 40 for holding adjacent the mouth when the phone is in use, as is very well known.

Grippable portion 30 of the housing 24 is preferably sized to allow the user's fingers to partially encircle the grippable portion and press it into the palm of hand 26. In particular, the size and shape of the grippable portion of the telephone should permit the user to grip and hold the device in the palm of the hand without use of the thumb 42. Instead, the fingers will press the grippable portion between the fingers and the "ball" of the thumb 44 (the "ball" being otherwise known as the thenar eminence). When device 20 is held in that manner, the thumb is free to move, at least temporarily, to a predetermined key-actuation position overlying keyboard 22 without losing an effective hold on the device. In other words, the user's thumb 42 can be moved freely between the position shown in FIGS. 1 and 2, or to an intermediate position for actuating the keyboard, while the user maintains a firm grip on the device.

Figure 3:
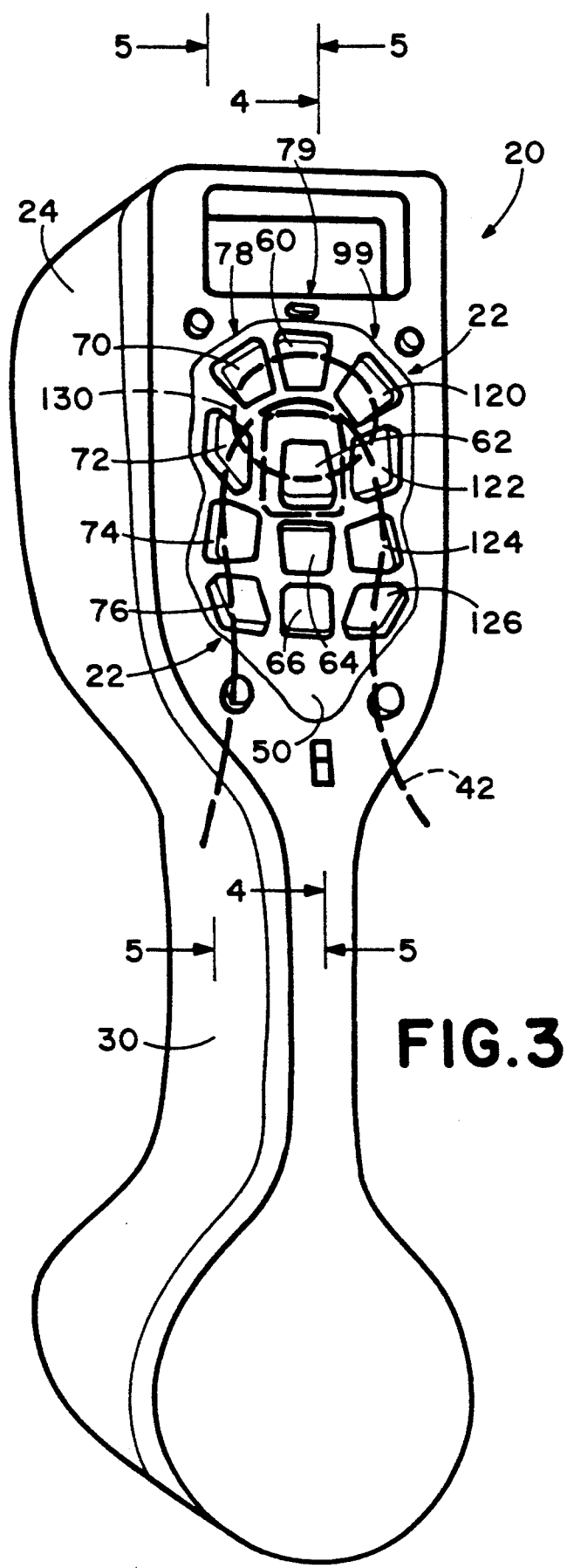
FIG. 3 is an enlarged perspective view of the portable telephone of FIGS. 1 and 2 illustrating (in phantom) the approximate location of the user's thumb when in its key-actuation position.

Turning next to FIG. 3, wherein the backside of the portable telephone device 20 is illustrated on an enlarged scale, keyboard 22 is positioned in a concavity or depression 50 in housing 24. The concavity 50 is located for convenient key-actuation by the user's thumb, which is shown in phantom at 42. The position of thumb 42 in FIG. 3 is referred to as the predetermined key-actuation position in which the thumb is in operational contact with the keyboard 22.

Keyboard 22 within concavity 50 is a thumb-associable cluster of depressible keys. Each of the keys is selectively actuable via movement along an axis of motion generally perpendicular to the support plane of the key.

In other words, each key is actuated by depressing the key. The illustration of the keys in FIG. 3 is somewhat schematic with respect to the support planes of the keys. The individual keys in keyboard 22 are oriented in planes which are angularly offset from one another in a unique arrangement which allows for selective actuation by the thumb with a minimum of motion, referred to in the parent application as "gestural" motion, as will be described below.

Figure 4:
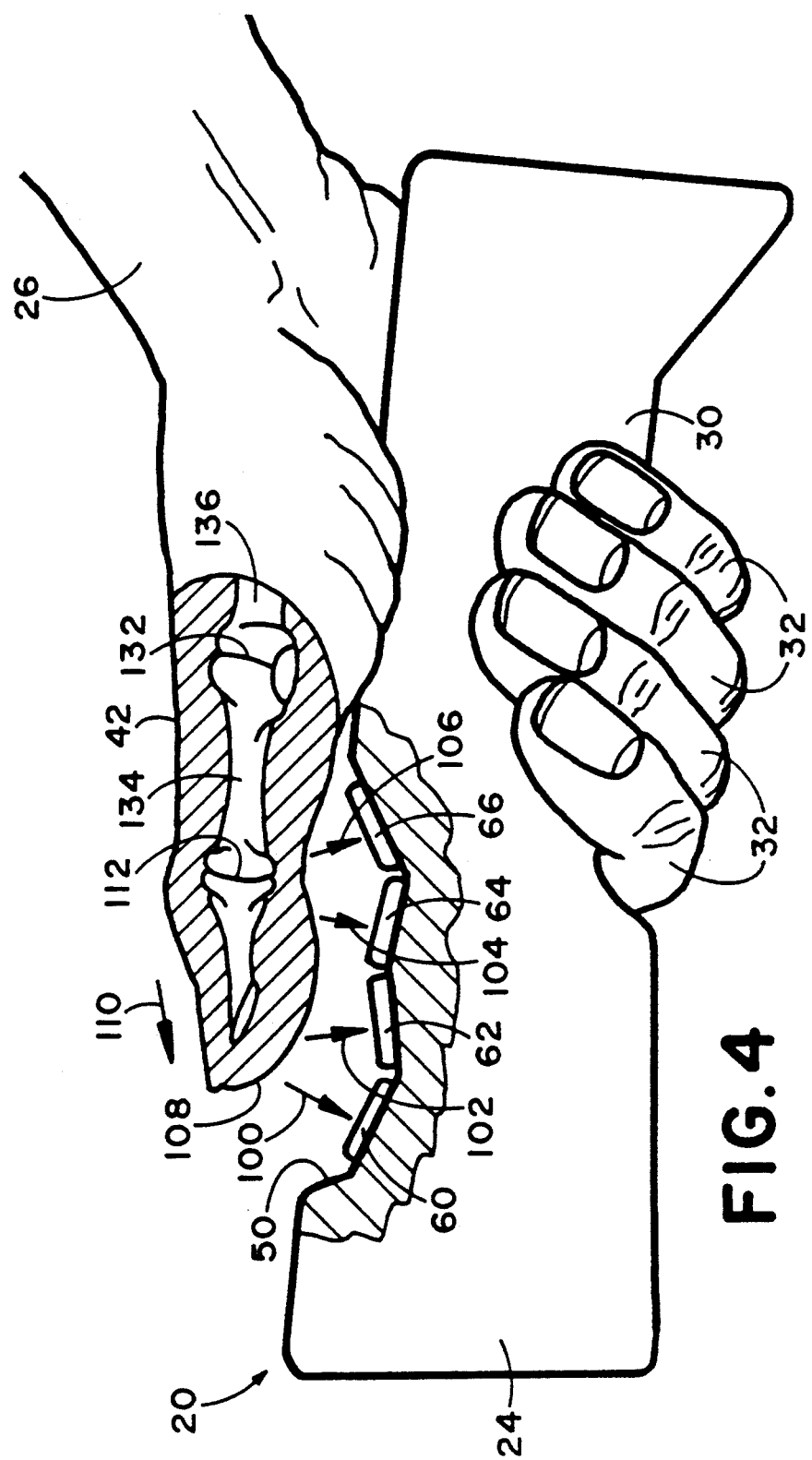
FIG. 4 is a side view of the portable telephone and hand shown in FIGS. 1 and 2, in partial cross section taken along lines 4—4 of FIG. 3, illustrating the position of the user's thumb when just above the key-actuation position.

Turning next to FIG. 4, which is a partially cross-sectional view of telephone 20 taken generally down the center longitudinal axis 51 of the telephone (see FIG. 1), the user's hand and thumb are illustrated with thumb positioned just above its key-actuation position. The concavity 50 in which the keys are positioned is illustrated in FIG. 4 with the central column of keys 60, 62, 64, 66 (which extend along axis 51) also illustrated. As noted above, the keys are oriented in planes which are angularly offset from one another.

Figure 5:
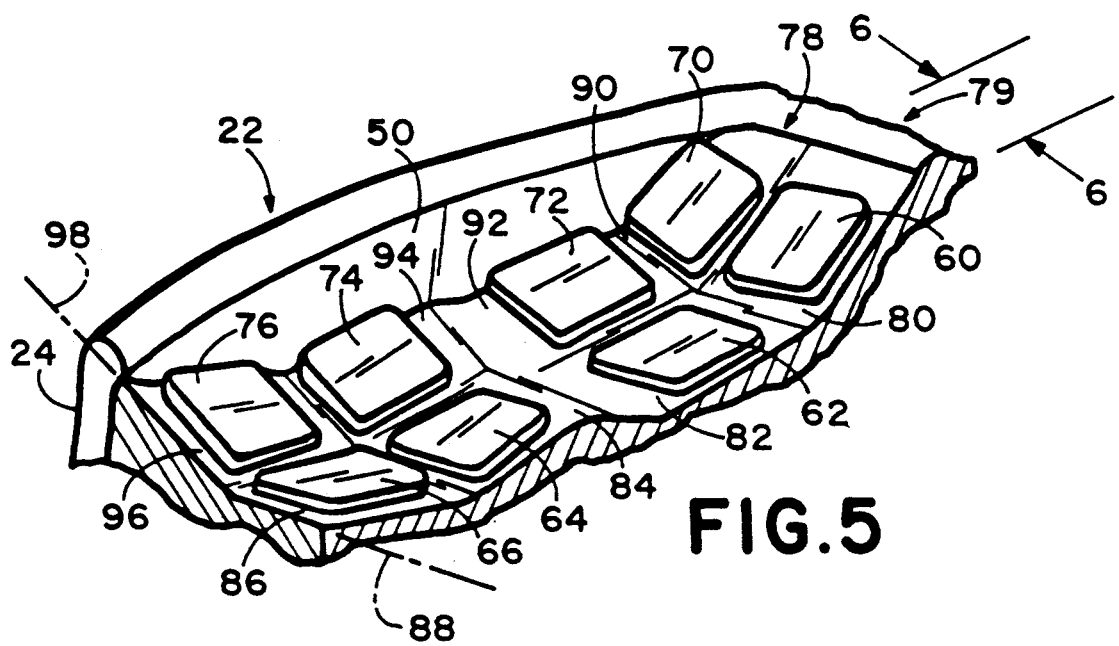
FIG. 5 is a partial, schematic, partially cross-sectional perspective view of a portion of the keyboard on the telephone of FIGS. 1-4 taken approximately between lines 5—5 of FIG. 3.

Turning attention now to FIG. 5, two columns of keys on the keyboard 22 are illustrated with all but the immediately adjacent parts of the housing cut away. Housing 50 is preferably formed of a suitable lightweight molded plastic material. Each of the keys herein is conventional in construction and takes the form of a momentary push button. Electrical connections to the keys have been omitted because they are conventional and form no part of the present invention. What is of importance is the angular orientation and placement of the individual keys in concavity 50, which will now be described. The leftmost longitudinal column of keys (as illustrated in FIG. 3) 70, 72, 74, 76, and the previously-identified central longitudinal column 79 of keys 60, 62, 64, 66 are depicted in FIG. 5 within a partial cross-sectional slice of concavity 50.

Figure 6:
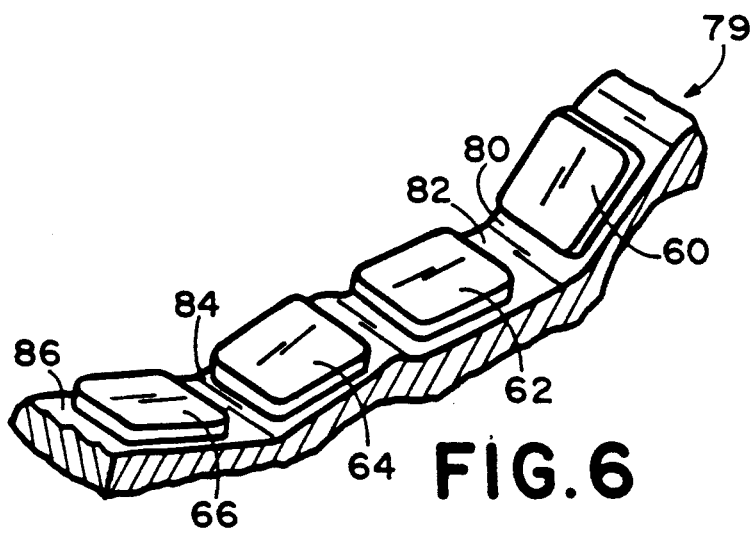
FIG. 6 is a partial perspective partially cross-sectional view taken between lines 6—6 of FIG. 5 showing the central column of keys in the cluster of keys and illustrating the angular offset between the support planes of individual keys.

Keys 60, 62, 64, 66, 70, 72, 74, 76 each lie on planar surfaces which are formed in concavity 50. Four of the planar surfaces support the central column 79 of keys 60, 62, 64, 66, the surfaces being shown separately at 80, 82, 84, 86, respectively, in FIG. 6. These planes intersect one another in a mixed pattern of obtuse and reflex angles according to the invention, and in this respect, planes 80, 82 intersect one another at an obtuse angle of about 105-degrees, planes 82, 84 at a reflex angle of about 210-degrees, and planes 84, 86 at an obtuse angle of about 150-degrees. As can be seen, there is a slight step which is formed between planes 82, 84. A similar relationship exists between the support planes 90, 92, 94, 96 for keys 70, 72, 74, 76, respectively (see FIG. 5). Namely, planes 90, 92 intersect one another at an obtuse angle of about 105-degrees, planes 92, 94 at a reflex angle of about 210-degrees, and planes 94, 96 at an obtuse angle of about 150-degrees. There is a slight step which is formed between planes 92, 94.

The entire left column of keys 70, 72, 74, 76 is angled downwardly into concavity 50, toward the central keys 60, 62, 64, 66. The angular offset between the rows of keys can in part be visualized and described by noting the angle of the plane 96 of key 76 with respect to a horizontal reference line 88, which represents the angle of the plane 86 of key 66. Line 98 and plane 96 meet line 88 and plane 86 at an obtuse angle of about 120-degrees.

The angular dispositions just described between the support planar surfaces for the keys in columns 78 and 79 have been selected herein, as will be explained, to take advantage of the underside architecture of the skin and bone structure in a user's thumb. Keyboard 22 also includes a third column of keys, i.e., the rightmost column generally parallel with columns 78 and 79. Rightmost column 99 is omitted from FIG. 5 for clarity but is a mirror image of leftmost column 78. In particular, the individual keys in rightmost column 99 are oriented in planes which are angularly offset from one another in the same manner as are the keys in leftmost column 78. The only difference between the orientations of the keys in columns 78 and 99 is that in column 78 the keys angle upwardly from right-to-left and the keys in column 99 the keys angle upwardly from left-to-right.

The advantage of having the keys in the cluster arrangement of keyboard 22 oriented in planes is that the angularly offset support planes for the keys allows the keys to be selectively actuated by mixed lateral, and slight endo, translation of a thumb positioned in concavity 50. Turning particularly to FIGS. 3, 4 and 5, the user moves his or her thumb 42 to a position overlying the central row of keys 79 whenever the user elects to actuate individual keys. FIG. 4 illustrates the thumb in partial cross section with the bones of the thumb visible. The thumb is depicted as hovering directly over the middle row 79 of keys 60, 62, 64, 66. Small arrows 100, 102, 104 and 106 indicate generally the direction in which actuating force must be applied to keys 60, 62, 64, 66, respectively, in order to actuate the individual keys.

When the user intends to actuate the keys, the thumb 42 is rotated downwardly onto the keyboard. In that position, each key in the keyboard can be actuated by slight gestural movements of the thumb. For example, the tip of the thumb 108 can exert a force in the direction of arrow 100 on key 60 by a slight endo movement of the thumb in the direction of arrow 110. A slight downward movement of tip 108 exerts an actuating movement in direction of arrow 102 on key 62. A slight flexure of the thumb in the region of the interphalangeal joint 112, flexing the joint downwardly together with a slight endo movement of the thumb, exerts a force in the direction of arrow 104 on key 64. Finally, a downward flexion of interphalangeal joint 112 with a slight retracting movement of the thumb, in the direction opposite to arrow 110, exerts a actuating force in the direction of arrow 106 on key 66.

Referring again to FIG. 3, the keys 70, 72, 74, 76 in the left column 78 of keys are actuated in a manner similar to that just described for the central column 79. If thumb 42 is rotated or moved slightly laterally to the left (as viewed in FIG. 3) and the gestural motions described in the last paragraph for actuating keys 60, 62, 64, 66 are repeated, keys 70, 72, 74, 76 are selectively actuated. In other words, a slight left lateral shift in the orientation of the forces exerted on the keyboard allows the user to selectively actuate the keys in left column 78. The keys in right column 99, namely, keys 120, 122, 124, 126 are similarly actuated by a slight right lateral movement of thumb 42, coupled with the gestural motions described in the preceding paragraph.

The thumb-actuated keyboard of the present invention requires only a small amount of movement of the user's thumb to selectively actuate any of the keys of the keyboard. The thumb need only be moved within a small cone of motion illustrated generally with dashed lines at 130 in FIG. 3 in order to actuate any individual key. The operative cone of motion 130 of the user's thumb has an apex adjacent the base of the thumb at 132, in the region of the joint between the first phalanx 134 and the first metacarpal bone 136. The user can move the thumb to any position within the cone of motion in order to operate the keys on keyboard 22. Or the thumb can be moved to a rest position away from keyboard 22 and outside the cone of motion whenever the user is not engaging the keyboard or entering information into the device via the keyboard.

Another way of describing the positions of the keys 52 in cavity 50 is to identify the keys in relationship to the thumb of the user when it is positioned in concavity 50. All the keys are supported on wall surfaces of concavity 50 in orientations which are angularly offset from one another, as described above. Referring to FIGS. 3, 4 and 5, the top row of keys 60, 70 and 120 are arrayed generally radially about the tip or distal end 110 of thumb 42 (see FIG. 4). Keys 60, 70 and 120 are positioned on a distal wall of concavity 50 which angles downwardly into the concavity and includes support plane 80 for key 60, support plane 90 for key 70, and a support plane which is a mirror image of support plane 90 for key 120.

The bottom row of keys on keyboard 22 include keys 66, 76 and 126. Those keys are closest to the proximal end of the user's thumb and are supported on a proximal wall of concavity 50 which angles downwardly into the concavity and supports keys 66, 76 and 126. The bottom row of keys are arrayed generally radially about the first phalanx 134 (see FIG. 4) of thumb 42 when the thumb is positioned in the concavity. The proximal wall of the concavity includes key support planes 86, 96 and a mirror image of plane 96 supporting key 126.

The medial keys of the keyboard 22 include keys 62, 64, 72, 74, 122 and 124. The medial keys are supported on medial wall surfaces of concavity 50 in orientations which array the keys generally radially about the first phalanx 134 (see FIG. 4) of thumb 42 when the thumb is positioned in the concavity. The medial key support planes include planes 82, 84 supporting keys 62, 64, respectively; planes 92, 94 supporting keys 72, 74, respectively; and support planes which are mirror images of planes 92, 94 supporting keys 122, 124, respectively.

The arrangement of the keys in the thumb-actuable key cluster 22 provides a means for entering information into an electronic system via a keyboard utilizing only thumb actuation. Moreover, only limited gestural key-actuation motion of the thumb is required in order to operate the keyboard.

Figure 7:
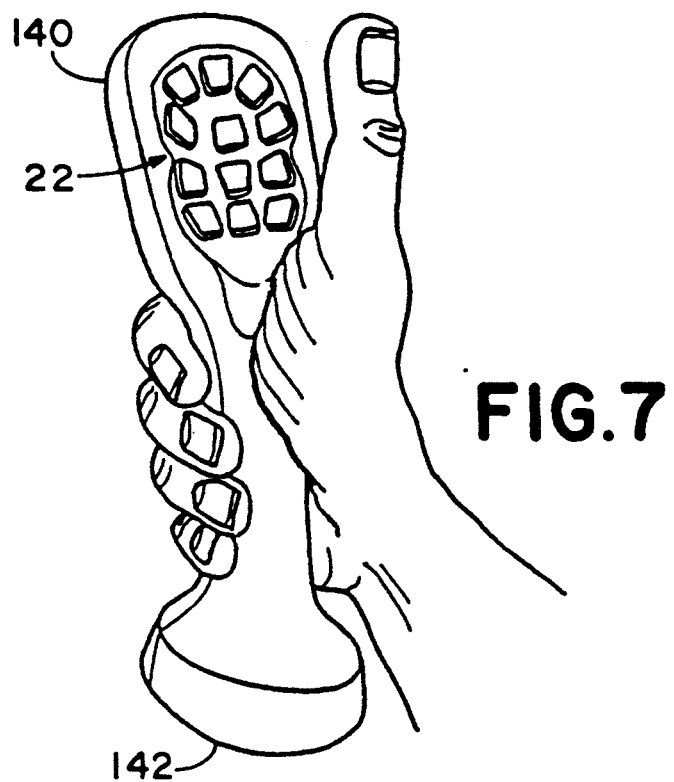
FIG. 7 is a perspective view as in FIG. 1 showing an alternative embodiment of a hand-held device incorporating the present invention.
Figure 8:
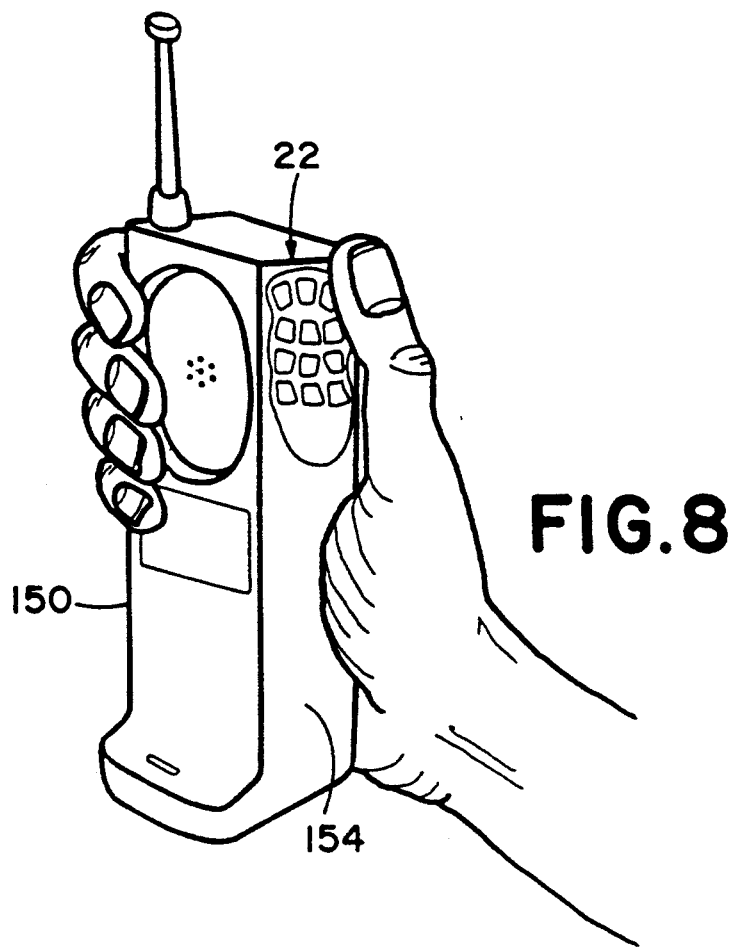
FIG. 8 is another alternative embodiment of the portable telephone of FIG. 1.

The present invention can also be incorporated into other types of devices. FIGS. 7 and 8 illustrate alternative embodiments of the present invention. In FIG. 7, a thumb-actuable keyboard 22 identical to the keyboard described above is incorporated into a hand-held device 140, which is a generic representation of a device for performing any desired task. Device 140 can be, for example, a control stick on a substantially larger piece of machinery. It can also be a hand-held device for scanning objects which pass beneath its base 142. It can be a hand-held calculator or another type of computational device. Or it can be an inventory control or other simple data entry device. FIG. 8 shows an alternative embodiment of a portable telephone 150 incorporating a keyboard 22 identical with the keyboard of the first embodiment. In this portable telephone 150, the keyboard is positioned on the side 154 of the telephone instead of on the back. Other potential applications for hand-held devices which include the thumb-associable keyboard of the present invention include video game controllers, robotics controllers, hand-held remote controller units for television sets, or model toy and airplane controllers. To further enhance the viability and usefulness of the overall system it may be ideal to modify the electronic system to which the keyboard is attached to include preprogrammed speaker-transmitted voice responses to the individual keystrokes actuated by the user.

While the preferred embodiment of the invention has been described herein, it is appreciated that variations and modifications will become apparent to those skilled in the art and may be made without departing from the spirit of the invention.

What is claimed is:

1. A hand-held device for entering information into an electronic system via a keyboard, the device comprising:

a housing having a grippable portion which permits the device to be held in one hand with the thumb free to move at least temporarily to a predetermined key-actuation position while the device is held, a concavity in said housing at said key-actuation position, and a thumb-associable cluster of keys forming a keyboard within said concavity, each of the plurality of keys in said cluster being selectively actuable via mixed lateral, and slight endo, translation of a thumb within said concavity, whereby information is entered into an electronic system.

2. A device as in claim 1 in which said keys are located in said concavity within a cone of motion of a user's thumb, when the thumb is positioned in said concavity, whose apex resides adjacent the base of the thumb.

3. A device as in claim 1 wherein said cluster of keys includes individual keys oriented in planes which are angularly offset from one another to permit selective actuation by said mixed lateral, and slight endo, translation of a thumb positioned in said concavity.

4. A device as in claim 1 in which said concavity in said housing includes wall surfaces for supporting individual keys in said cluster in orientations which are angularly offset from one another, including a distal wall which angles downwardly into said concavity and supports a plurality of distal keys arrayed generally radially about the tip of a thumb when positioned in said concavity, a proximal wall which angles downwardly into said concavity and supports a plurality of proximal keys arrayed generally radially about the first phalanx of a thumb when positioned in said concavity, and a plurality of medial wall surfaces supporting a plurality of medial keys in orientations which partially surround the interphalangeal joint of a thumb when positioned in said concavity.

5. A device as in claim 1 in which said grippable portion is a handle which can be gripped between the fingers and thenar eminence of a user's hand, whereby when the device is gripped thus, the user's thumb is selectively movable into said concavity without the user losing a grip on the device.

* * * * *